(12) United States Patent
Carau, Sr.

(10) Patent No.: US 6,266,048 B1
(45) Date of Patent: *Jul. 24, 2001

(54) METHOD AND APPARATUS FOR A VIRTUAL DISPLAY/KEYBOARD FOR A PDA

(75) Inventor: Frank P. Carau, Sr., Loveland, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,400

(22) Filed: Aug. 27, 1998

(51) Int. Cl.[7] .................. G09G 5/08; G09G 5/00
(52) U.S. Cl. ...................... 345/168; 345/158; 341/22
(58) Field of Search ......................... 345/156, 158, 345/168, 7, 8, 169; 341/22; 708/142–146

(56) References Cited

U.S. PATENT DOCUMENTS

| | | | |
|---|---|---|---|
| 4,468,694 | * 8/1984 | Edgar | 358/93 |
| 4,782,328 | * 11/1988 | Denlinger | 340/645 P |
| 5,510,806 | 4/1996 | Busch | 345/87 |
| 5,528,263 | * 6/1996 | Platzker et al. | 345/156 |
| 5,767,842 | * 6/1998 | Korth | 345/168 |
| 5,786,810 | 7/1998 | Knox et al. | 345/168 |
| 5,789,739 | 8/1998 | Schwarz | 250/221 |
| 5,953,153 | * 9/1999 | Conner et al. | 359/298 |
| 5,969,698 | * 10/1999 | Richard et al. | 345/7 |

FOREIGN PATENT DOCUMENTS

| | | | |
|---|---|---|---|
| 29802435 U 1 | 5/1998 | (DE) | G06K/9/62 |
| 626 636 | 11/1994 | (EP) | G06F/3/033 |
| 571702A2 | * 11/1993 | (JP) . | |

* cited by examiner

Primary Examiner—Jeffery Brier
Assistant Examiner—Anthony J. Blackman

(57) ABSTRACT

An improved computer or PDA with a projected display onto a substantially flat, white surface to create a virtual computer screen display and a projected keyboard onto the substantially flat, white surface and a laser sensor projected over the keyboard and parallel to the substantially flat, white surface to create a virtual keyboard. The virtual display and virtual keyboard permit the computer or PDA to be substantially smaller than typical computers or PDA's, while also permitting a relatively normal size display and keyboard/user input area.

4 Claims, 2 Drawing Sheets

METHOD AND APPARATUS FOR A VIRTUAL DISPLAY/KEYBOARD FOR A PDA

FIELD OF THE INVENTION

The present invention relates generally to the field of personal digital assistants (PDA's) and more particularly to keyboards for PDA's. In particular, this invention provides a space saving virtual display/keyboard for a PDA.

BACKGROUND OF THE INVENTION

Personal digital assistants (PDA's), such as the Apple Newton or the Palm PILOT, have become very useful devices for carrying personal notes, calendars, appointments, phone numbers, 'to do' lists, etc. PDA's are hand held personal computers that help to manage personal information. It would be desirable for PDA's to be as small as possible, such as the size of a credit card, so that they could be carried in a wallet, purse, pocket, brief case, etc. Two of the main limiting factors to the size of PDA's is the requirement for a reasonable quality display and some means for user input, such as a keyboard or area for pen input. To date there has been a tremendous tug-of-war between the desirable small size for portability and the larger size necessary for user input. Accordingly, it would be desirable for a PDA to be relatively small for portability, yet also have a reasonably sized display and user input area.

SUMMARY OF THE INVENTION

The above and other aspects of the present invention are accomplished in a personal digital assistant (PDA) having a virtual display/keyboard. In the PDA according to the present invention, the PDA uses a projection display to create a virtual screen and a projection "finger sensor" to create a virtual keyboard on any flat, light colored surface.

BRIEF DESCRIPTION OF THE DRAWINGS

The above and other objects, features and advantages of the present invention will be to better understood by reading the following more particular description of the invention, presented in conjunction with the following drawings, wherein.

DETAILED DESCRIPTION OF THE PREFERRED EMBODIMENT

Figure 1:
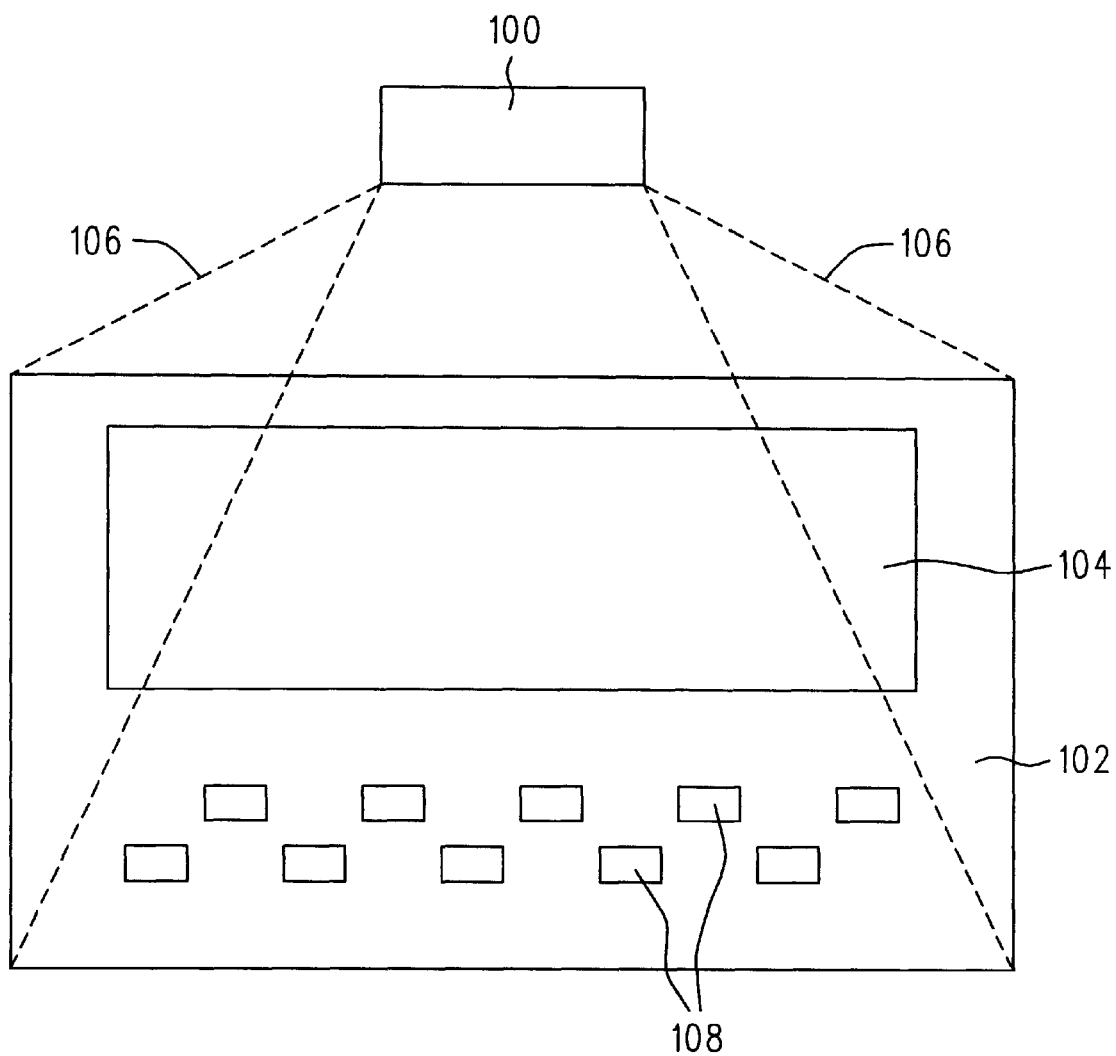
FIG. 1 illustrates a top view of a virtual display/keyboard for a PDA according to the present invention.
Figure 2:
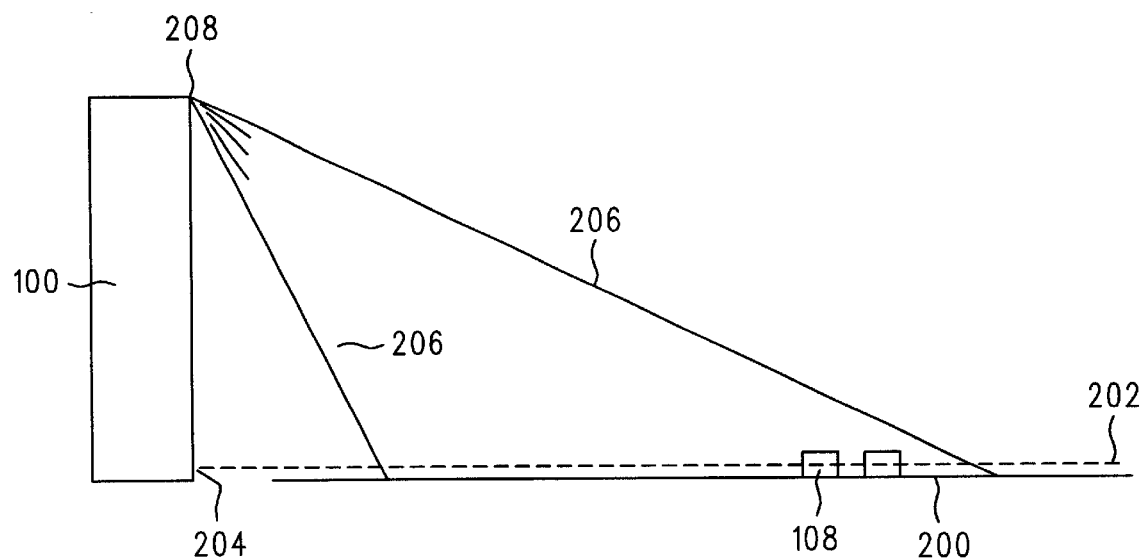
FIG. 2 illustrates a side view of a virtual display/keyboard for a PDA according to the present invention.

FIG. 1 shows a top view of a PDA 100 projecting a virtual display 104 and a virtual keyboard 108 onto a flat, light colored surface 102. The projection surface 102 would preferably be a substantially white surface, such as a sheet of paper. Also, the virtual keys on the virtual keyboard 108 need not be, but may preferably be in a staggered pattern to allow for laser sensor pick-up, as shown in FIG. 2. The projection 106 may be accomplished by means of one of several projection technologies. One example would be the Texas Instruments Digital Micro mirror Display (DMD).

Figure 3:
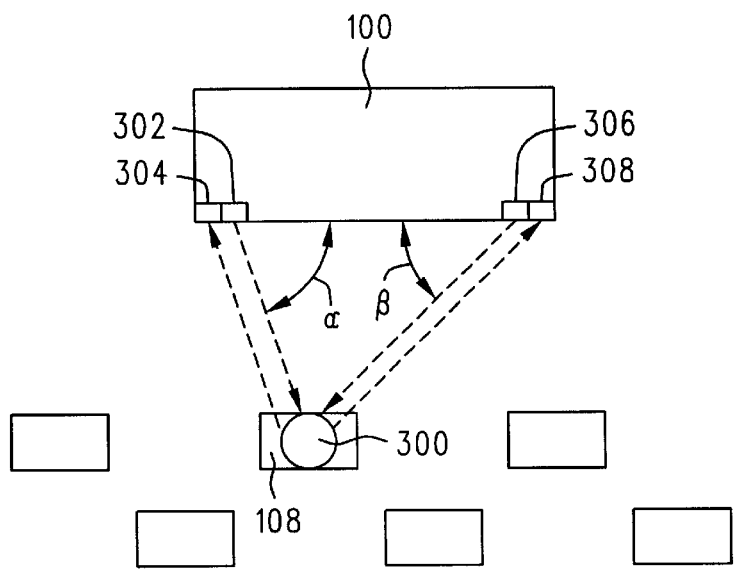
FIG. 3 illustrates a top view of a virtual display/keyboard for a PDA having projection lasers and sensors for determining finger stroke positioning according to the present invention.

FIG. 2 shows a side view of PDA 100 with projection 206 being emitted from a top edge 208 of the PDA card 100 onto a substantially flat, light colored surface 200, such as a white sheet of paper. Finger sensing of virtual keyboard keys 108 is accomplished by means of laser beams 202 emitted from a bottom edge 204 of PDA card 100 just above the surface of the flat, light colored surface 200. Accordingly, each laser 302 and 306 would sense when a finger or pen 300 had broken the laser beam 202 by sensing the reflection from the finger 300 of the returned laser light to a sensor device 304 and 308, such as a CCD array, see FIG. 3. Measuring the laser angle α and β for each of two lasers 302 and 306 to the finger 300 would identify the exact key location 108. This allows the PDA 100 to sense that the user had "touched" a key 108, either as a keystroke or a pointing action.

In operation, any data that would normally be displayed on a notebook screen or computer CRT will be projected onto the flat, light colored surface 200 by means of, for example a Digital Micro mirror Display 101 (positioned inside the PDA 100 as shown in FIG. 2). Also, virtual keys of a keyboard 108 will be projected on to the light colored surface 200 in a staggered fashion, such that when the user touched or points to a particular key, laser sensors 204 at the bottom edge of the PDA card 100 will detect which key is being indicated and the PDA 100 will accept the input as if a key on an actual keyboard had been depressed. Also, as the application of the PDA changes from, for example, a calendar to an address book or to a personal notebook,the functions of the various keys on the virtual keyboard may change to correspond to the associated application of the PDA 100. It should also be noted that the PDA projects a virtual display screen 104 and virtual keyboard 108 that is substantially larger than the area of the PDA. This is how the dual goals of a small PDA size for Portability and a large display/user input area is accomplished—by projecting a much larger display/keyboard from a small PDA card.

The foregoing description of the present invention has been presented for purposes of illustration and description. It is not intended to be exhaustive or to limit the invention to the precise form disclosed, and other modifications and variations may be possible in light of the above teachings. For example, the present invention may also be utilized in personal notebooks, personal computers, recreational computer games or in any similar situation where there is a need to conserve the space typically utilized for the computer display and user input/keyboard for the purposes of portability or changing desk top configurations, etc. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A display/keyboard of a hand-held personal digital assistant comprising:

a virtual display projected from said personal digital assistant by means of a Digital Micro mirror Display positioned within said personal digital assistant onto a substantially flat, light colored surface located remotely from said personal digital assistant;

a virtual keyboard projected from said personal digital assistant by means of a Digital Micro mirror Display positioned within said personal digital assistant onto said substantially flat, light colored surface, whereby said virtual display and said virtual keyboard comprise an area which is larger than the area of any surface on said personal digital assistant; and two laser sensors projected across said virtual keyboard and substantially parallel to said substantially flat, light colored surface, wherein said laser sensors are intercepted over a virtual key of said virtual keyboard thereby creating input, and said personal digital assistant processes said input as if a physical key on a physical keyboard had been selected.

2. A method for creating a virtual display and keyboard for a hand-held personal digital assistant, comprising the following steps:
   a) projecting a virtual display of data representative of a personal digital assistant display from a top edge of said hand-held personal digital assistant onto a substantially flat, light colored surface located remotely from said hand-held personal digital assistant, said virtual display comprising an area which is larger than the area of any surface on said hand-held personal digital assistant;
   b) projecting a virtual keyboard from said top edge of said hand-held personal digital assistant onto said substantially flat, light colored surface, said virtual keyboard comprising an area which is substantially larger than the area of any surface on said personal digital assistant;
   c) projecting a plurality of laser beams from a bottom edge of said hand-held personal digital assistant at an angle to one another across said virtual keyboard, said laser beams being projected substantially parallel to and slightly above said substantially flat, light colored surface;
   d) sensing when said laser beams are intercepted over a virtual key of said virtual keyboard thereby creating input; and
   e) processing said input within said hand-held personal digital assistant as if a physical key on a physical keyboard had been selected.

3. The method according to claim 2, wherein the projecting steps are accomplished by means of a Digital Micro mirror Display positioned within said hand-held personal digital assistant.

4. A hand-held personal digital assistant, comprising:
   a) a Digital Micro mirror Display positioned within said hand-held personal digital assistant, said Digital Micro mirror Display comprising:
      i) a virtual display projected from a top edge of said hand-held personal digital assistant onto a substantially flat, light colored surface, said virtual display comprising an area which is larger than the area of any surface on said hand-held personal digital assistant; and
      ii) a virtual keyboard projected from said top edge of said hand-held personal digital assistant onto said substantially flat, light colored surface, said virtual keyboard comprising an area which is substantially larger than the area of any surface on said personal digital assistant;
   b) a plurality of laser sensors positioned within said personal digital assistant at a bottom edge thereof, said laser sensors comprising laser beams projected therefrom at an angle to one another across said virtual keyboard, substantially parallel to and slightly above said substantially flat, light colored surface, said laser sensors being adapted to sense when said laser beams are intercepted over a virtual key of said virtual keyboard, thereby creating input, said input being processed by said hand-held personal digital assistant as if a physical key on a physical keyboard had been selected.

* * * * *